US010436439B1

(12) United States Patent
Traeger (10) Patent No.: US 10,436,439 B1
(45) Date of Patent: Oct. 8, 2019

(54) WOOD PELLET BURNER UNIT WITH SLIDING FLOOR HOPPER

(71) Applicant: ORIGINAL PELLET GRILL COMPANY LLC, Mount Angel, OR (US)

(72) Inventor: Joe Traeger, Mount Angel, OR (US)

(73) Assignee: Original Pellet Grill Company LLC, Mount Angel, OR (US)

( * ) Notice: Subject to any disclaimer, the term of this patent is extended or adjusted under 35 U.S.C. 154(b) by 380 days.

(21) Appl. No.: 15/371,174

(22) Filed: Dec. 6, 2016

Related U.S. Application Data (60) Provisional application No. 62/264,461, filed on Dec. 8, 2015.

(51) Int. Cl.
| | |
|---|---|
| *F23B 40/00* | (2006.01) |
| *F24B 13/04* | (2006.01) |
| *F23K 3/16* | (2006.01) |
| *F23B 50/12* | (2006.01) |

(52) U.S. Cl.
CPC .............. *F23B 40/00* (2013.01); *F23B 50/12* (2013.01); *F23K 3/16* (2013.01); *F24B 13/04* (2013.01); *F23B 2900/00001* (2013.01); *F23G 2205/10* (2013.01); *F23G 2205/14* (2013.01); *F23K 2203/004* (2013.01)

(58) Field of Classification Search
CPC ..................... F23B 40/00; F23B 50/12; F23B 2900/00001; F24B 13/04; F23K 3/16; F23K 2203/004; F23G 2205/14; F23G 2205/10
See application file for complete search history.

(56) References Cited

U.S. PATENT DOCUMENTS

| | | | | | |
|---|---|---|---|---|---|
| 4,549,490 | A | * | 10/1985 | Wetzel ...................... | F23K 3/16 110/101 R |
| 5,000,100 | A | * | 3/1991 | Mendive ................... | F23B 1/30 110/101 C |
| 5,151,000 | A | * | 9/1992 | Geraghty .................. | F23K 3/16 110/248 |
| 9,140,448 | B2 | * | 9/2015 | Freeman ................... | F23K 3/16 |

\* cited by examiner

*Primary Examiner* — David J Laux
(74) *Attorney, Agent, or Firm* — Renaissance IP Law Group, LLP; David A. Crowther (57) ABSTRACT

Embodiments include a wood pellet burner unit with a sliding floor hopper. The wood pellet burner unit includes a wood pellet fire pit, a wood pellet kettle burner, a wood pellet barbeque burner, and/or a wood pellet smoker, or the like. The sliding floor hopper includes an upper loading section having an opening therein that receives wood pellets, and a staging section coupled to the upper loading section and stages the wood pellets received from the upper loading section. A sliding floor is disposed atop a staging surface of the staging section and through a slit in the staging section. The sliding floor oscillates between a forward position and a back position. The sliding floor oscillates between a forward position and a back position to automatically and periodically feed the wood pellets to a lower region of the wood pellet burner unit on a continuous basis.

18 Claims, 9 Drawing Sheets

WOOD PELLET BURNER UNIT WITH SLIDING FLOOR HOPPER

RELATED APPLICATION DATA

This application claims the benefit of commonly-owned U.S. Provisional Patent Application No. 62/264,461, filed on Dec. 8, 2015, which is hereby incorporated by reference.

TECHNICAL FIELD

This application pertains to wood pellet fire pits, and more particularly, to a wood pellet burner unit having a sliding floor hopper for automatic and continuous wood pellet fuel feeding.

BACKGROUND

Wood burning fire pits, kettle burners, barbeque burners, smokers, and the like are popular among outdoor enthusiasts who enjoy the smells, warmth, and the ambiance that they provide. However, conventional wood burner units cannot be refueled easily at the appropriate proportional rates. Burdensome manual intervention is needed to restock the burner unit to maintain the flames and heat, and at the wrong proportions, the flames can be smothered. Moreover, conventional wood burning units are deficient in areas of capacity, flame reliability, and effective burning methods.

Accordingly, a need remains for an improved wood pellet burner unit with a sliding floor hopper. Embodiments of the inventive concept address these and other limitations in the prior art.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first unit could be termed a second unit, and, similarly, a second unit could be termed a first unit, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the inventive concept include a wood pellet burner unit with a sliding floor hopper. The wood pellet burner unit can include a wood pellet fire pit, a wood pellet kettle burner, a wood pellet barbeque burner, and/or a wood pellet smoker, or the like. For the sake of simplicity of reference, the burner unit is generally referred to herein as a wood pellet burner unit.

Figure 1:
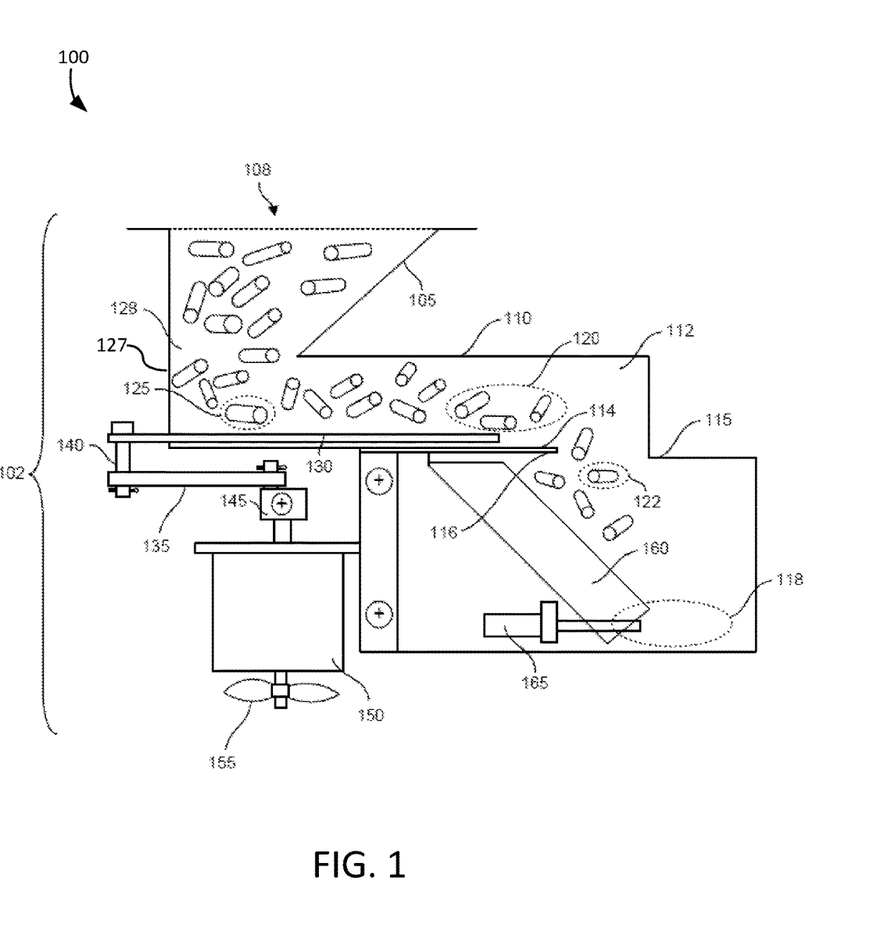
FIG. 1 illustrates a cross-sectional side elevation view diagram of an example wood pellet burner unit in accordance with various embodiments of the inventive concept.

FIG. 1 illustrates a cross-sectional side elevation view diagram of an example wood pellet burner unit 100 in accordance with various embodiments of the inventive concept. The wood pellet burner unit 100 can include a sliding floor hopper 102. The sliding floor hopper 102 can include an upper loading section 105 having an opening 108 therein through which wood pellets (e.g., 125 and 120) can be received. The sliding floor hopper 102 can include a staging section 110 in which the wood pellets can be staged for automatic and periodic feeding on a continuous basis into the burner section 115.

The sliding floor hopper 102 can include a sliding floor 130. The sliding floor 130 can be caused to laterally oscillate in a continuous cycle, which can automatically feed the burner section 115. For example, the sliding floor 130 can be caused to slide from a back position to a forward position, and then can be caused to return to the back position, and so forth. The wood pellets (e.g., 125) can accumulate in or near a back region 128 of the staging section 110 when the sliding floor 130 is in the back position. For example, a back wall 127 of the staging section 110 can stop the wood pellets 125 when the sliding floor 130 slides to the back position, thereby causing the wood pellets 125 to bunch in or near the back region 128 of the staging section 110. Then, when the sliding floor 130 transitions from the back position to the forward position, the pellets 125 near the back region 128 can be pushed forward by the sliding floor 130 toward a front region 112 of the staging section 110. Simultaneously, when the sliding floor 130 transitions to the forward position, some of the wood pellets (e.g., 120) can be pushed off of a staging surface 114 of the staging section 110, thereby causing some of the wood pellets (e.g., 122) to be pushed over a staging edge 116, and to tumble onto a fire grate 160 and into the burner section 115. For example, a front edge of the sliding floor 130 can push the wood pellets 122 over the staging edge 116, thereby providing additional room for more wood pellets to accumulate and be staged in the staging section 110.

The sliding floor hopper 102 can include a motor 150, a cam 145, a connecting shaft 135, a connecting pin 140, and the sliding floor 130. The motor 150 can be a gear motor, for example. The motor 150 can be a low-torque motor such as in the range of 5 to 15 Inch-pounds. For example, the motor 150 can be a 10 Inch-pound low-torque motor. The cam 145 can transform rotary motion of the motor 150 into a substantially linear motion of the connecting shaft 135, and corresponding linear motion of the sliding floor 130. The connecting shaft 135 can cause the sliding floor 130 to laterally oscillate by use of the connecting pin 140. In an alternative embodiment, the cam 145 can be coupled directly to the sliding floor 130 such that it directly oscillates the sliding floor 130 in the lateral directions (not shown). The motor 150 can have a fan 155 attached thereto to provide cooling to the motor 150. The fan 155 can be spun by the rotary motion of the motor 150.

Within the burner section 115 of the wood pellet burner unit 100, the fire grate 160 can be at least partially disposed below the staging edge 116 to receive the wood pellets (e.g., 122) as they are pushed off the staging edge 116. The wood pellets 122 can travel down the fire grate 160 and form near a lower region 118 of the fire grate 160 and the burner section 115. An igniter 165 can be at least partially disposed near the lower region 118 and can cause the wood pellets 122 that congregate near the lower region 118 to ignite. The igniter 165 can be manually and/or electrically controlled. The igniter 165 can be disposed through the fire grate 160.

Figure 2A:
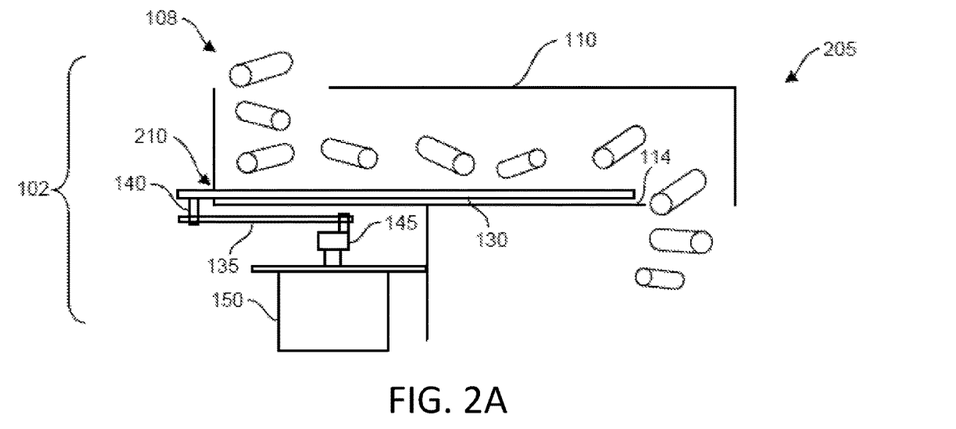
FIG. 2A illustrates a cross-sectional side elevation view diagram of a section of the example wood pellet burner unit of FIG. 1 showing the sliding floor hopper in a first configuration in accordance with various embodiments of the inventive concept.
Figure 2B:
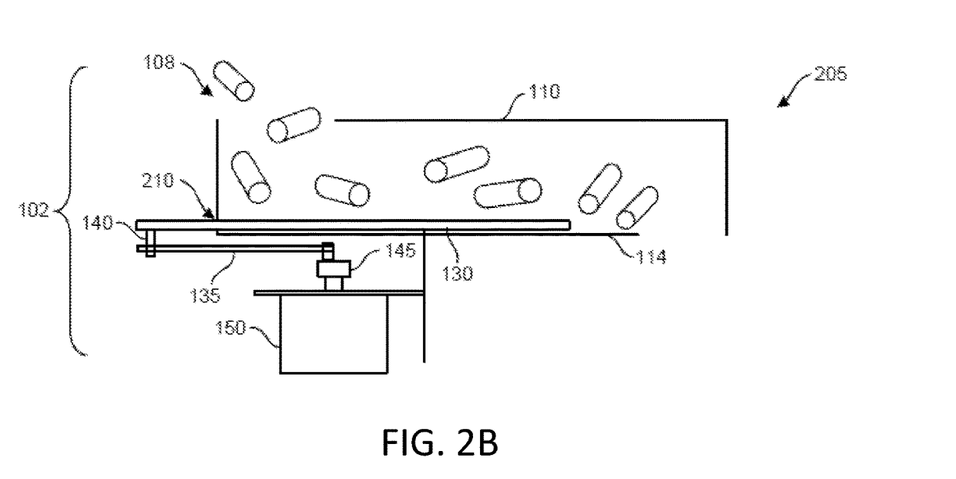
FIG. 2B illustrates a cross-sectional side elevation view diagram of a section of the example wood pellet burner unit of FIG. 1 showing the sliding floor hopper in a second configuration in accordance with various embodiments of the inventive concept.
Figure 2C:
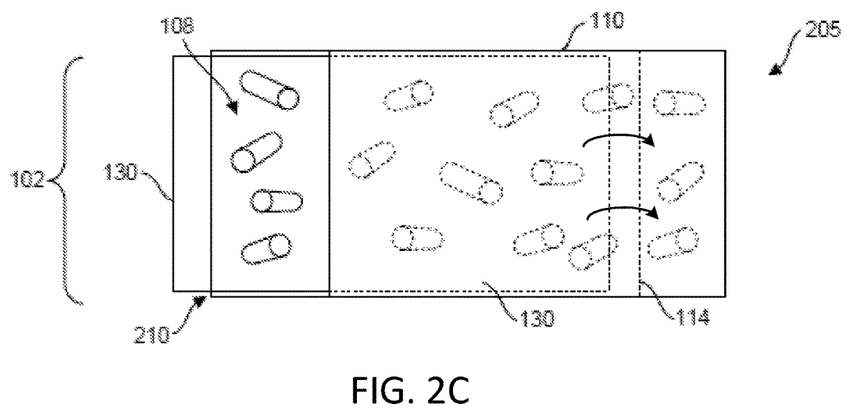
FIG. 2C illustrates a plan view diagram of a section of the example wood pellet burner unit of FIG. 1 showing the sliding floor hopper in the first configuration in accordance with various embodiments of the inventive concept.
Figure 2D:
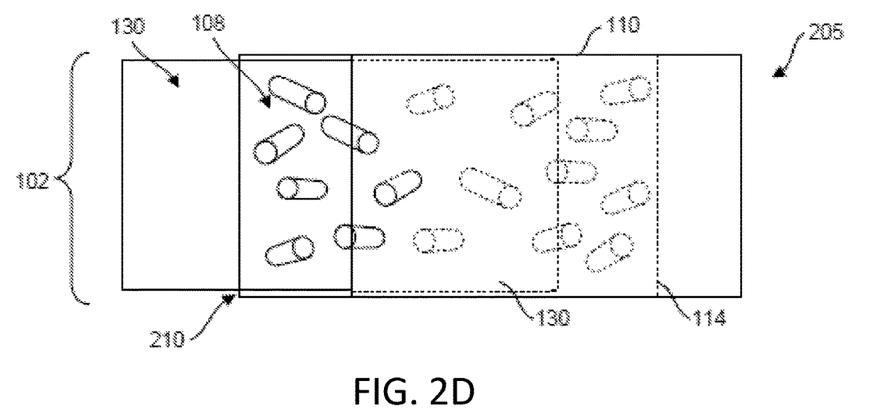
FIG. 2D illustrates a plan view diagram of a section of the example wood pellet burner unit of FIG. 1 showing the sliding floor hopper in the second configuration in accordance with various embodiments of the inventive concept.

FIG. 2A illustrates a cross-sectional side elevation view diagram of a section 205 of the example wood pellet burner unit 100 of FIG. 1 showing the sliding floor hopper 102 in a first configuration in accordance with various embodiments of the inventive concept. FIG. 2B illustrates a cross-sectional side elevation view diagram of the section 205 of the example wood pellet burner unit 100 of FIG. 1 showing the sliding floor hopper 102 in a second configuration in accordance with various embodiments of the inventive concept. FIG. 2C illustrates a plan view diagram of the section 205 of the example wood pellet burner unit 100 of FIG. 1 showing the sliding floor hopper 102 in the first configuration in accordance with various embodiments of the inventive concept. FIG. 2D illustrates a plan view diagram of the section 205 of the example wood pellet burner unit 100 of FIG. 1 showing the sliding floor hopper 102 in the second configuration in accordance with various embodiments of the inventive concept. Reference is now made to FIGS. 2A through 2D. The reference numerals of some components are described above with reference to FIG. 1, and therefore a detailed description of such components is not necessarily repeated.

As shown in FIGS. 2A and 2C, the first configuration of the sliding floor hopper 102 can correspond to the sliding floor 130 being in the forward position. As shown in FIGS. 2B and 2D, the second configuration of the sliding floor hopper 102 can correspond to the sliding floor 130 being in the back position. The motor 150, cam 145, connecting shaft 135, and/or connecting pin 140 can cause the sliding floor 130 to oscillate between the forward position and the back position, thereby causing the wood pellets to automatically and periodically be fed on a continuous basis to the lower region 118 (of FIG. 1) of the burner unit 100. The sliding floor 130 can be disposed atop the staging surface 114 and through a slit 210 in the staging section 110.

Figure 3:
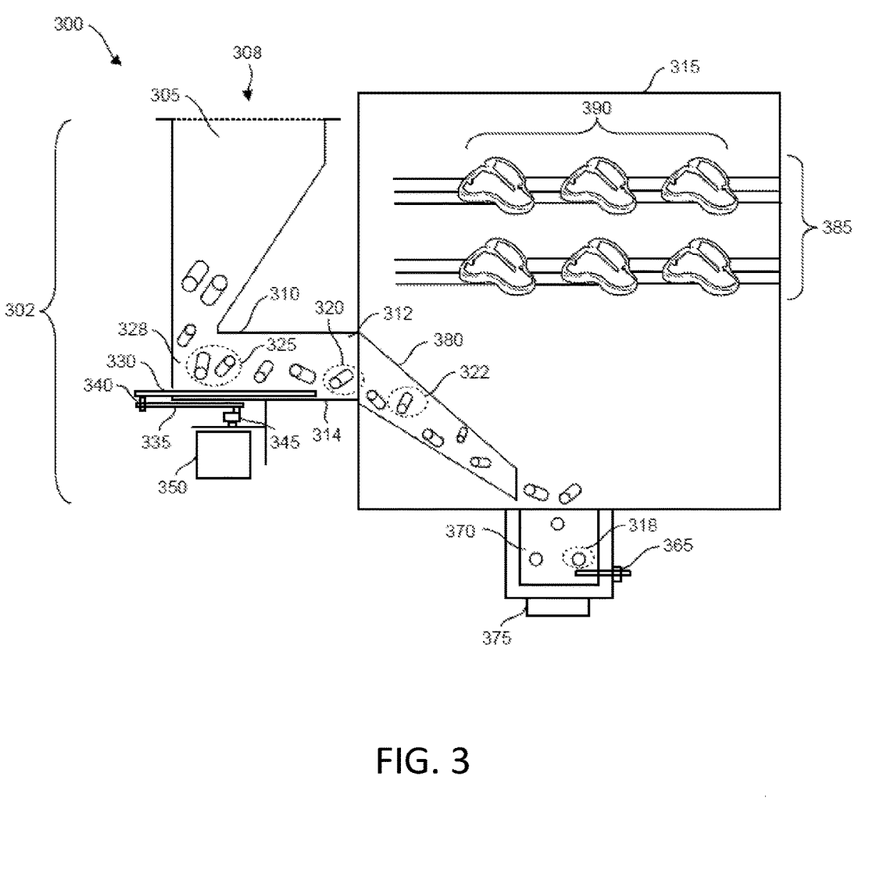
FIG. 3 illustrates a cross-sectional side elevation view diagram of an example wood pellet burner unit and smoker in accordance with various embodiments of the inventive concept.

FIG. 3 illustrates a cross-sectional side elevation view diagram of an example wood pellet burner unit 300 in accordance with various embodiments of the inventive concept. The wood pellet burner unit 300 can include a smoker housing 315. The wood pellet burner unit 300 can include a sliding floor hopper 302. The sliding floor hopper 302 can include an upper loading section 305 having an opening 308 through which wood pellets (e.g., 325 and 320) can be received. The sliding floor hopper 302 can include a staging section 310 in which the wood pellets can be staged for automatic and periodic feeding on a continuous basis into the smoker housing 315.

The sliding floor hopper 302 can include a sliding floor 330. The sliding floor 330 can be caused to laterally oscillate in a continuous cycle, which can automatically feed the smoker housing 315. For example, the sliding floor 330 can be caused to slide from a back position to a forward position, and then can be caused to return to the back position, and so forth. The wood pellets (e.g., 325) can accumulate near a back region 328 of the staging section 310 when the sliding floor 330 is in the back position. Then, when the sliding floor 330 transitions from the back position to the forward position, the pellets 325 near the back region 328 can be pushed forward toward a front region 312 of the staging section 310.

Simultaneously, when the sliding floor 330 transitions to the forward position, some of the wood pellets (e.g., 320)

can be pushed off of a staging surface 314 of the staging section 310, thereby causing some of the wood pellets (e.g., 322) to be pushed into a chute 380, and to tumble down the chute 380 into a fire pot 370. The chute 380 can be coupled the staging section 310 on all sides so that the wood pellets (e.g., 320 and 322) are kept within the staging section 310 and the chute 380. The fire pot 370 can accumulate and burn the wood pellets (e.g., 318). An igniter 365 can be disposed within or through the fire pot 370. The igniter 365 can cause the wood pellets (e.g., 318) that congregate within the fire pot 370 to ignite. The igniter 365 can be manually and/or electrically controlled. The fire pot can include a combustion fan 375 attached thereto, which can fan and energize the flames, and keep the fire pot 370 efficiently burning the wood pellets (e.g., 318).

The sliding floor hopper 302 can include motor 350, a cam 345, a connecting shaft 335, a connecting pin 340, and the sliding floor 330. The motor 350 can be a gear motor, for example. The motor 350 can be a low-torque motor such as in the range of 5 to 15 Inch-pounds. For example, the motor 350 can be a 10 Inch-pound low-torque motor. The cam 345 can transform rotary motion of the motor 350 into a substantially linear motion of the connecting shaft 335. In an alternative embodiment, the cam 345 can be coupled directly to the sliding floor 330 such that it directly oscillates the sliding floor 130 in the lateral directions (not shown). The connecting shaft 335 can cause the sliding floor 330 to laterally oscillate by use of the connecting pin 340. The motor 350 can have a fan 355 attached thereto to provide cooling to the motor 350. The fan 355 can be spun by the rotary motion of the motor 350.

The fire pot 370 can be disposed below and offset from the staging surface 314 to receive the wood pellets (e.g., 322) as they are pushed off the staging surface 314. In addition, the fire pot 370 can be disposed below the smoker housing 315. The wood pellets 322 can travel down the chute 380 and form near a lower region of the fire pot 370. The smoker housing 315 can include one more racks or grills 385 for holding meat 390 or other suitable food items to be smoked within the smoker housing 315.

Figure 4:
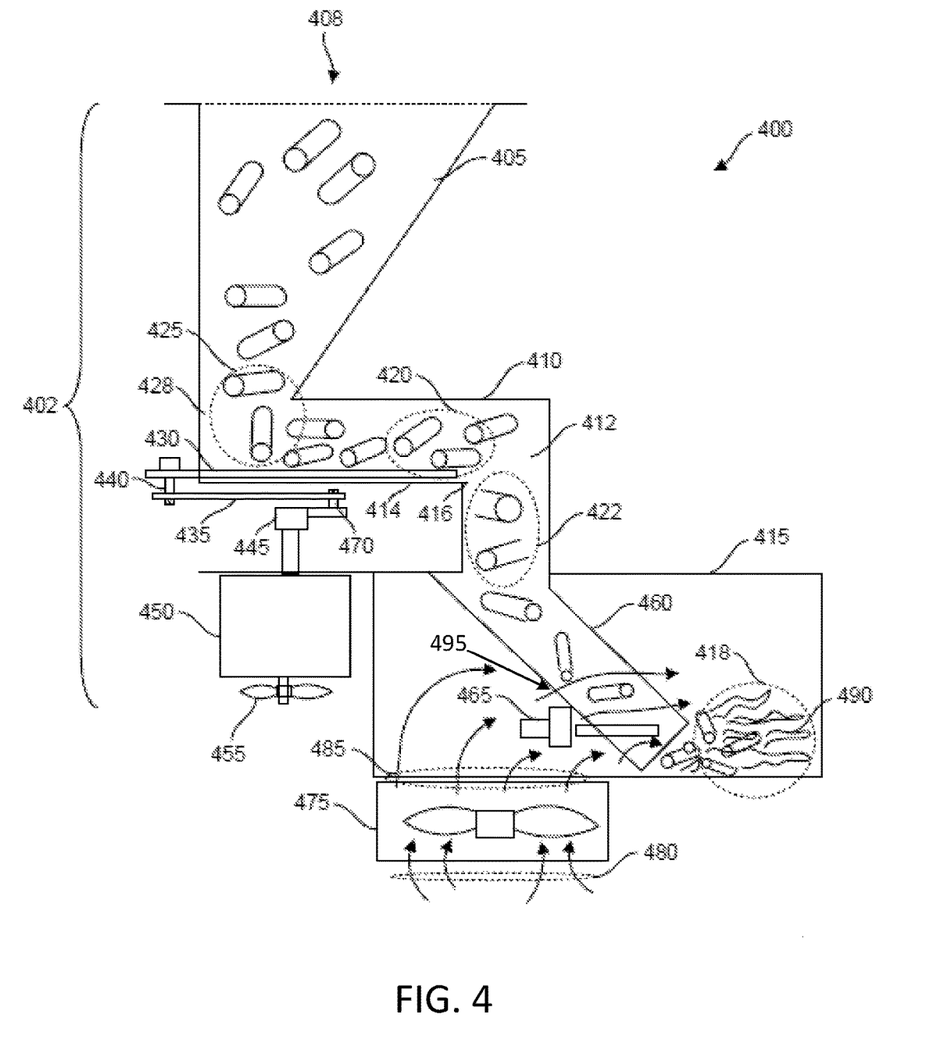
FIG. 4 illustrates a cross-sectional side elevation view diagram of another example wood pellet burner unit in accordance with various embodiments of the inventive concept.

FIG. 4 illustrates a cross-sectional side elevation view diagram of another example wood pellet burner unit 400 in accordance with various embodiments of the inventive concept. The wood pellet burner unit 400 can include a sliding floor hopper 402. The sliding floor hopper 402 can include an upper loading section 405 having an opening 408 through which wood pellets (e.g., 425 and 420) can be received. The sliding floor hopper 402 can include a staging section 410 in which the wood pellets can be staged for automatic and periodic feeding on a continuous basis into the burner section 415.

The sliding floor hopper 402 can include a sliding floor 430. The sliding floor 430 can be caused to laterally oscillate in a continuous cycle, which can automatically feed the burner section 415. For example, the sliding floor 430 can be caused to slide from a back position to a forward position, and then can be caused to return to the back position, and so forth. The wood pellets (e.g., 425) can accumulate near a back region 428 of the staging section 410 when the sliding floor 430 is in the back position. Then, when the sliding floor 430 transitions from the back position to the forward position, the pellets 425 near the back region 428 can be pushed forward toward a front region 412 of the staging section 410. Simultaneously, when the sliding floor 430 transitions to the forward position, some of the wood pellets (e.g., 420) can be pushed off of a staging surface 414 of the staging section 410, thereby causing some of the wood pellets (e.g., 422) to be pushed over a staging edge 416, and to tumble onto a fire grate 460 and into burner section 415.

The sliding floor hopper 402 can include motor 450, a cam 445, a connecting shaft 435, a connecting pin 440, a second connecting pin 470, and the sliding floor 430. The connecting pin 440 is directly coupled to the sliding floor 430 and directly coupled to the connecting shaft 435. The second connecting pin 470 is directly coupled to the connecting shaft 435 and directly coupled to the cam 445. The motor 450 can be a gear motor, for example. The motor 450 can be a low-torque motor such as in the range of 5 to 15 Inch-pounds. For example, the motor 450 can be a 10 Inch-pound low-torque motor. The cam 445 can transform rotary motion of the motor 450 into a substantially linear motion of the connecting shaft 435. In an alternative embodiment, the cam 445 can be coupled directly to the sliding floor 430 such that it directly oscillates the sliding floor 430 in the lateral directions (not shown). The connecting shaft 435 can cause the sliding floor 430 to laterally oscillate by use of the connecting pin 440 and the second connecting pin 470. The motor 450 can have a fan 455 attached thereto to provide cooling to the motor 450. The fan 455 can be spun by the rotary motion of the motor 450.

Within the burner section 415 of the wood pellet burner unit 400, the fire grate 460 can be at least partially disposed below the staging edge 416 to receive the wood pellets (e.g., 422) as they are pushed off the staging edge 416. The wood pellets 422 can travel down the fire grate 460 and form near a lower region 418 of the fire grate 460 and the burner section 415. An igniter 465 can be disposed near the lower region 418 and can cause the wood pellets 422 that congregate near the lower region 418 to ignite. The igniter 465 can be manually and/or electrically controlled.

A combustion fan 475 can be attached to the burner section 415 of the wood pellet burner unit 400. The combustion fan can provide air 480, including oxygen, to fan and energize the flames 490, and to keep the burner section 415 efficiently burning the wood pellets (e.g., 418). The air 480 can be pushed by the combustion fan 475 through a vent or opening 485 into the burner section 415, through holes 495 in the fire grate 460, and toward the wood pellets (e.g., 418), thereby fanning and energizing the flames 490 so that the wood pellets continue to burn.

Figure 5:
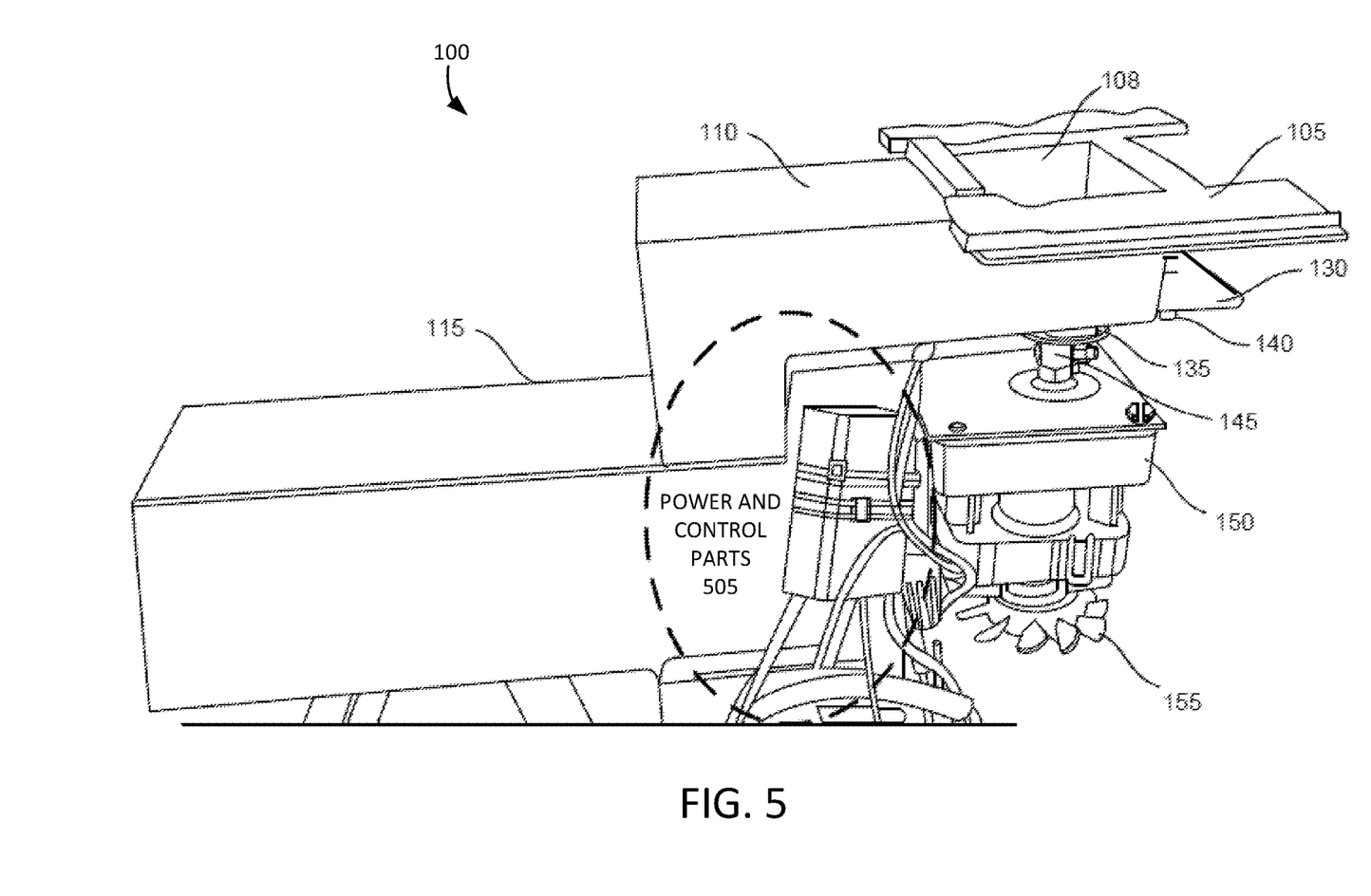
FIG. 5 shows a perspective view of an example wood pellet burner unit in accordance with various embodiments of the inventive concept.

FIG. 5 shows a perspective view of an example wood pellet burner unit 100 in accordance with various embodiments of the inventive concept. Reference numerals appearing in FIG. 5 are described above with reference to FIG. 1, and therefore a detailed description of such components is not repeated. The wood burner unit 100 can include power and control parts 505. For example, the power and control parts 505 can include one or more power cables, power control units, batteries, or the like, for powering and controlling the motor 150, the igniter 165, or other components of the wood pellet burner unit 100. It will be understood that the components shown in the perspective view of FIG. 5 can also be included in the wood pellet burner units 300 and 400.

Figure 6:
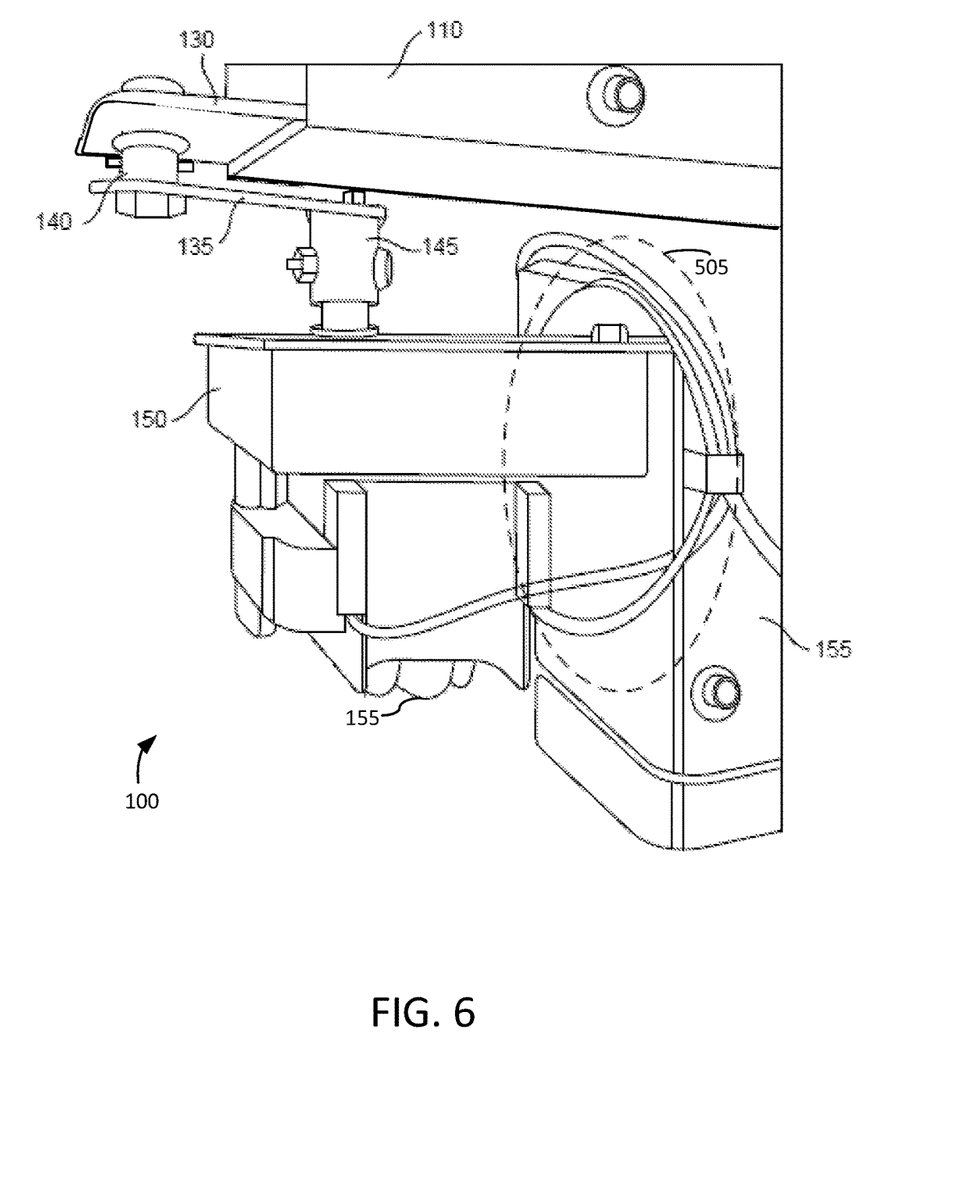
FIG. 6 shows a perspective view of an example motor and cam section of the example wood pellet burner unit of FIG. 5 in accordance with various embodiments of the inventive concept.

FIG. 6 shows a perspective view of an example motor and cam section of the example wood pellet burner unit 100 of FIG. 5 in accordance with various embodiments of the inventive concept. Reference numerals appearing in FIG. 6 are described above with reference to FIG. 1, and therefore a detailed description of such components is not repeated. It will be understood that the components shown in the perspective view of FIG. 6 can also be included in the wood pellet burner units 300 and 400.

Figure 7:
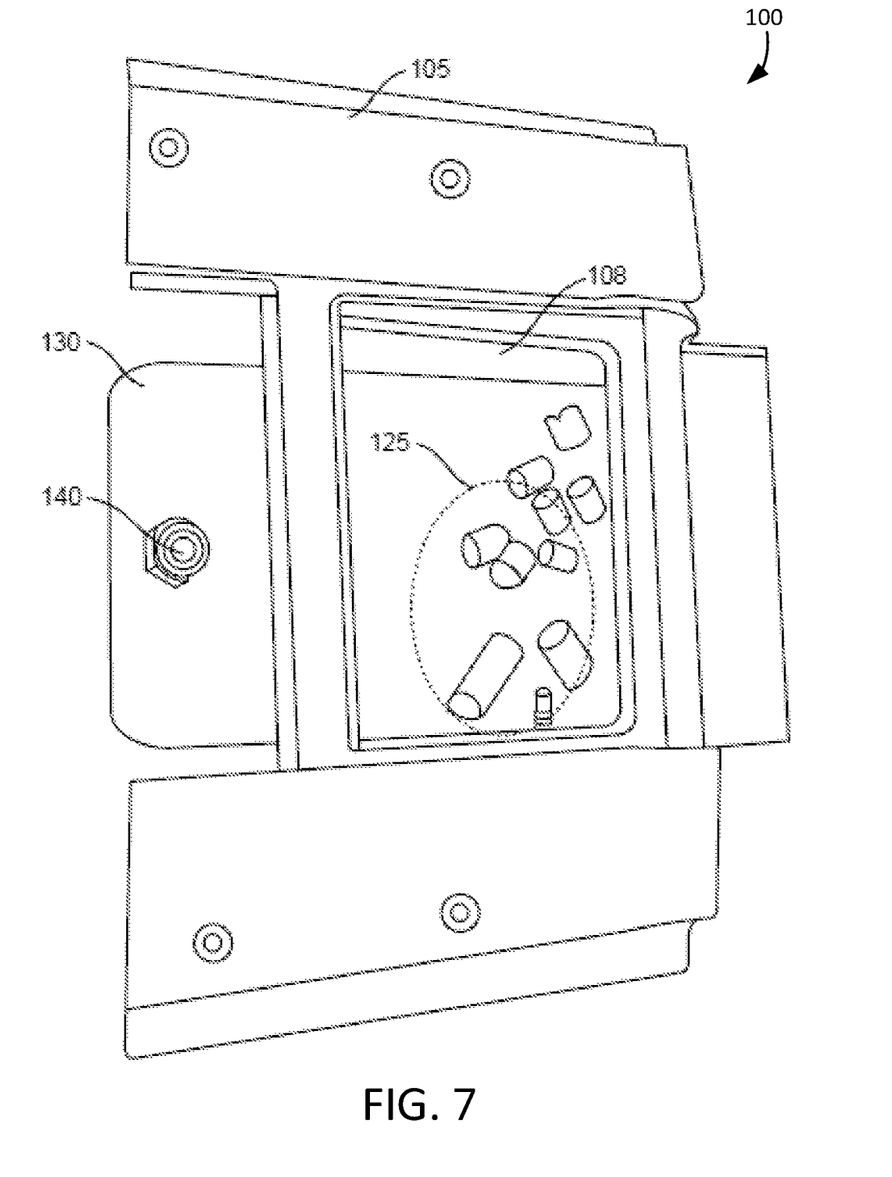
FIG. 7 shows a perspective view of an example hopper section of the example wood pellet burner unit of FIG. 5 in accordance with various embodiments of the inventive concept.

FIG. 7 shows a perspective view of an example hopper section of the example wood pellet burner unit 100 of FIG.

5 in accordance with various embodiments of the inventive concept. Reference numerals appearing in FIG. 7 are described above with reference to FIG. 1, and therefore a detailed description of such components is not repeated. It will be understood that the components shown in the perspective view of FIG. 7 can also be included in the wood pellet burner units 300 and 400.

Figure 8:
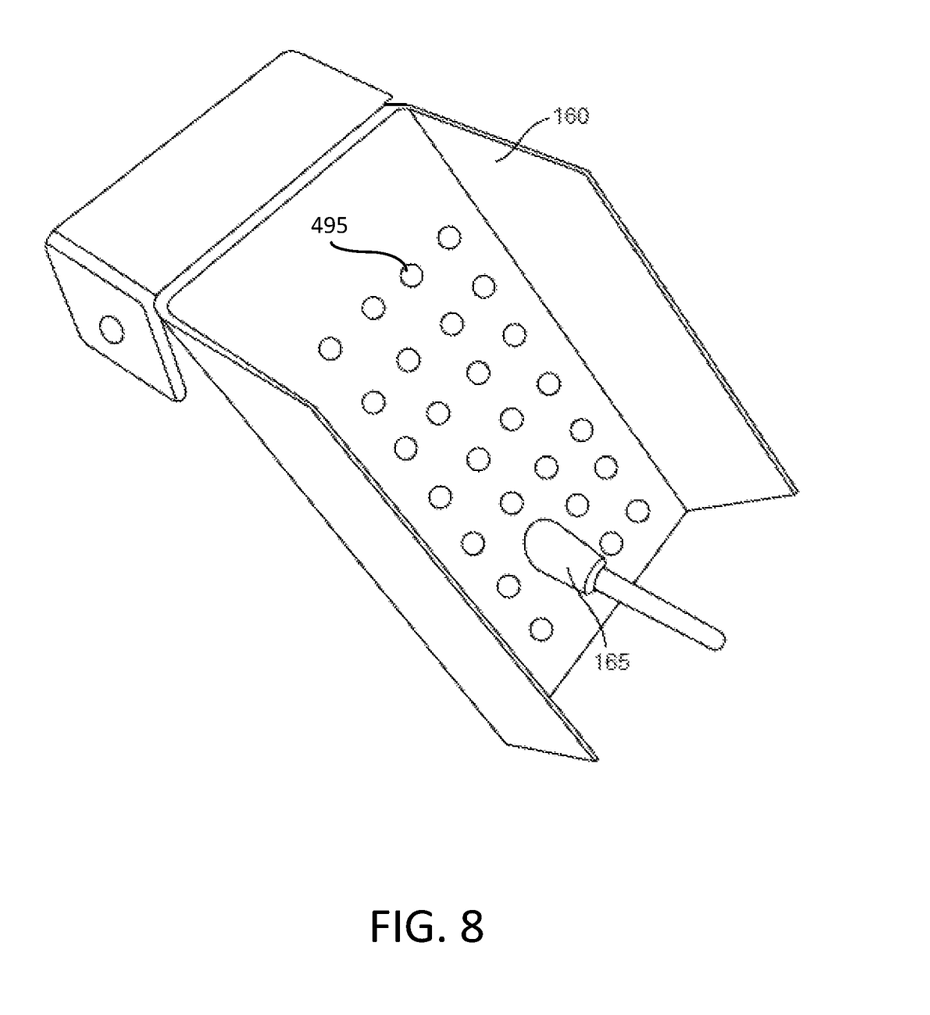
FIG. 8 shows a perspective view of an example grate and igniter section of the example wood pellet burner unit of FIG. 5 in accordance with various embodiments of the inventive concept.

FIG. 8 shows a perspective view of a fire grate 160 and igniter 165 of the example wood pellet burner unit 100 of FIG. 5 in accordance with various embodiments of the inventive concept. Reference numerals appearing in FIG. 8 are described above with reference to FIG. 1, and therefore a detailed description of such components is not repeated. It will be understood that the components shown in the perspective view of FIG. 7 can also be included in the wood pellet burner units 300 and 400.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In some embodiments, a sliding floor hopper for a wood pellet burner unit is disclosed. The sliding floor hopper can include an upper loading section having an opening therein that is configured to receive wood pellets, a staging section coupled to the upper loading section and configured to stage the wood pellets received from the upper loading section, and a sliding floor disposed atop a staging surface of the staging section and through a slit in the staging section, wherein the sliding floor is configured to oscillate between a forward position and a back position.

In some embodiments, the sliding floor hopper further includes a motor, a connecting shaft, a cam coupled to the motor and to the connecting shaft, and configured to transform rotary motion of the motor into a substantially linear motion of the connecting shaft, and a connecting pin coupled to the connecting shaft and to the sliding floor. The connecting shaft and the connecting pin are configured to cause the sliding floor to oscillate between the forward position and the back position.

In some embodiments, the motor, the connecting shaft, the cam, and the connecting pin are configured to cause the sliding floor to laterally oscillate between the forward position and the back position to automatically and periodically feed the wood pellets to a lower region of the wood pellet burner unit on a continuous basis. The sliding floor hopper may further include a fan coupled to the motor to provide cooling to the motor. The fan may be configured to spin by the rotary motion of the motor. In some embodiments, the motor is a gear motor. In some embodiments, the sliding floor is configured to accumulate the wood pellets in or near a back region of the staging section responsive to the sliding floor sliding to the back position. In some embodiments, the sliding floor is configured to push the wood pellets from the back region of the staging section forward toward a front region of the staging section responsive to the sliding floor sliding to the forward position.

In some embodiments, the staging section can include a back wall. In some embodiments, the back wall is configured to cause the wood pellets to bunch in or near a back region of the staging section responsive to the sliding floor sliding to the back position. In some embodiments, the sliding floor is configured to push the wood pellets from the back region of the staging section forward toward a front region of the staging section responsive to the sliding floor sliding to the forward position. In some embodiments, a front edge of the sliding floor is configured to push at least some of the wood pellets off of the staging surface of the staging section to a lower region of the wood pellet burner unit responsive to the sliding floor sliding to the forward position.

Embodiments of the inventive concept include a wood pellet burner unit having a sliding floor hopper. The sliding floor hopper can include an upper loading section having an opening therein that is configured to receive wood pellets, a staging section coupled to the upper loading section and configured to stage the wood pellets received from the upper loading section, and a sliding floor disposed atop a staging surface of the staging section and through a slit in the staging section, wherein the sliding floor is configured to oscillate between a forward position and a back position, wherein the sliding floor is configured to push the wood pellets from a back region of the staging section forward toward a front region of the staging section responsive to the sliding floor sliding to the forward position, and off of the staging surface of the staging section;

In some embodiments, the wood pellet burner unit includes a lower region configured to receive the wood pellets from the staging section, and an igniter configured to ignite the wood pellets in the lower region of the wood pellet burner unit. In some embodiments, the wood pellet burner unit further includes a fire grate coupled to the staging surface and configured to receive the wood pellets from the staging section, and to guide the wood pellets to the lower region of the wood pellet burner unit. In some embodiments, the wood pellet burner unit further includes a burner section that encloses the fire grate, the igniter, and the lower region of the wood pellet burner unit.

In some embodiments, the wood pellet burner unit further includes a combustion fan coupled to the burner section and configured to fan flames within the burner section. In some embodiments, the fire grate includes a plurality of holes disposed therein. In some embodiments, the igniter is disposed through the fire grate. In some embodiments, the combustion fan is coupled to a bottom surface of the burner section below the fire grate. In some embodiments, the combustion fan is configured to provide external air toward an interior of the burner section, through the plurality of holes in the fire grate, and toward the wood pellets in the lower region of the burner unit so that the wood pellets continue to burn.

In some embodiments, the wood pellet burner unit includes a chute coupled to the staging section and configured to receive the wood pellets from the staging section, and to guide the wood pellets to the lower region of the wood pellet burner unit. In some embodiments, the wood pellet burner unit includes a smoker housing and a fire pot. In some embodiments, the smoker housing encloses the chute, the fire pot is coupled to a bottom surface of the smoker housing, the chute is configured to guide the wood pellets into the fire pot, and the igniter is coupled to the fire pot.

In some embodiments, the wood pellet burner unit further includes a combustion fan coupled to the fire pot and configured to fan flames within the fire pot. In some embodiments, the smoker housing includes one or more racks or grills for holding meat. In some embodiments, the igniter is disposed through a wall of the fire pot.

Even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A sliding floor hopper for a wood pellet burner unit, comprising:
    an upper loading section having an opening therein that is configured to receive wood pellets;
    a staging section coupled to the upper loading section and configured to stage the wood pellets received from the upper loading section; and
    a sliding floor disposed atop a staging surface of the staging section and through a slit in the staging section, wherein the sliding floor is configured to oscillate between a forward position and a back position, wherein the sliding floor is a single contiguous sliding floor disposed atop the staging surface of the staging section; the staging section includes a back wall; the slit in the staging section is a slit through the back wall of the staging section; the slit is horizontally oriented in the back wall of the staging section; the back wall of the staging section is an outer wall of the sliding floor hopper; a width of the slit is approximately the same as a width of the single contiguous sliding floor; and the single contiguous sliding floor is disposed through the slit through the back wall of the staging section.

2. The sliding floor hopper of claim 1, further comprising:
    a motor;
    a connecting shaft;
    a cam coupled to the motor and to the connecting shaft, and configured to transform rotary motion of the motor into a substantially linear motion of the connecting shaft; and
    a connecting pin coupled to the connecting shaft and to the sliding floor, wherein the connecting shaft and the connecting pin are configured to cause the sliding floor to oscillate between the forward position and the back position.

3. The sliding floor hopper of claim 2, wherein the motor, the connecting shaft, the cam, and the connecting pin are configured to cause the sliding floor to laterally oscillate between the forward position and the back position to automatically and periodically feed the wood pellets to a lower region of the wood pellet burner unit on a continuous basis.

4. The sliding floor hopper of claim 2, further comprising a fan coupled to the motor to provide cooling to the motor, wherein the fan is configured to spin by the rotary motion of the motor.

5. The sliding floor hopper of claim 2, wherein the motor is a gear motor.

6. The sliding floor hopper of claim 2, wherein:
    the sliding floor is configured to accumulate the wood pellets in or near a back region of the staging section responsive to the sliding floor sliding to the back position; and
    the sliding floor is configured to push the wood pellets from the back region of the staging section forward toward a front region of the staging section responsive to the sliding floor sliding to the forward position.

7. The sliding floor hopper of claim 2, wherein:
    the staging section includes a back wall;
    the back wall is configured to cause the wood pellets to bunch in or near a back region of the staging section responsive to the sliding floor sliding to the back position;
    the sliding floor is configured to push the wood pellets from the back region of the staging section forward toward a front region of the staging section responsive to the sliding floor sliding to the forward position; and
    a front edge of the sliding floor is configured to push at least some of the wood pellets off of the staging surface of the staging section to a lower region of the wood pellet burner unit responsive to the sliding floor sliding to the forward position.

8. The sliding floor hopper of claim 1, further comprising:
    a motor;
    a connecting shaft;
    a cam coupled to the motor and to the connecting shaft, and configured to transform rotary motion of the motor into a substantially linear motion of the connecting shaft;
    a first connecting pin directly coupled to the single contiguous sliding floor and directly coupled to the connecting shaft; and
    a second connecting pin directly coupled to the connecting shaft and directly coupled to the cam,
    wherein the connecting shaft, the first connecting pin, and the second connecting pin are configured to cause the single contiguous sliding floor to oscillate between the forward position and the back position through the slit in the outer wall of the sliding floor hopper.

9. The sliding floor hopper of claim 8, wherein:
    the single contiguous sliding floor includes a circular hole having a diameter that is approximately the same as a diameter of the first connecting pin;
    the first connecting pin is disposed through the circular hole of the single contiguous sliding floor; and
    the first connecting pin is configured to laterally oscillate with the single contiguous sliding floor in a linear motion to automatically and periodically feed the wood pellets to a lower region of the wood pellet burner unit on a continuous basis.

10. A wood pellet burner unit, comprising:
    a sliding floor hopper, comprising:
        an upper loading section having an opening therein that is configured to receive wood pellets;
        a staging section coupled to the upper loading section and configured to stage the wood pellets received from the upper loading section; and
        a sliding floor disposed atop a staging surface of the staging section and through a slit in the staging section, wherein the sliding floor is configured to oscillate between a forward position and a back position, wherein the sliding floor is configured to push the wood pellets from a back region of the staging section forward toward a front region of the staging section responsive to the sliding floor sliding to the forward position, and off of the staging surface of the staging section;
    a lower region of the wood pellet burner unit configured to receive the wood pellets from the staging section;
    an igniter configured to ignite the wood pellets in the lower region of the wood pellet burner unit a fire grate couple to the staging surface and configured to:

receive the wood pellets from the staging section; and guide the wood pellets to the lower region of the wood pellet burner unit; wherein the sliding floor hopper further includes:

a motor;

a connecting shaft;

a cam coupled to the motor and to the connecting shaft, and configured to transform rotarty motion of the motor into a substantially linear motion of the connecting shaft;

a first connecting pin directly coupled to the sliding floor and directly coupled to the connecting shaft; and a second connecting pin directly coupled to the connecting shaft and directly coupled to the cam;

wherein:

the sliding floor is a single contiguous sliding floor disposed atop the staging surface of the staging section;

the staging section includes a back wall;

the slit in the staging section is a slit through the back wall of the staging section;

the slit is horizontally oriented in the back wall of the staging section;

the back wall of the staging section is an outer wall of the sliding floor hoppen;

a width of the slit is approximately the same as a width of the single contiguous sliding floor;

the single contiguous sliding floor is disposed through the slit through the back wall of the staging section;

the connecting shaft, the first connecting pin, and the second connecting pin are configured to cause the single contiguous sliding floorto oscillate between the forward position and the back position through the slit in the outer wall of the sliding floor hopper;

the single contiguous sliding floor includes a circular hole having a diameter that is approximately the same as a diameter of the first connecting pin;

the first connecting pin is disposed through the circular hole of the single contiguous sliding floor; and the first connecting pin is configured to laterally oscillate with the single contiguous sliding floor in a linear motion to automatically and periodiwlly feed the wood pellets to a lower region of the wood pellet burner unit on a continuous basis.

11. The wood pellet burner unit of claim 10, further comprising a burner section that encloses the fire grate, the igniter, and the lower region of the wood pellet burner unit.

12. The wood pellet burner unit of claim 11, further comprising a combustion fan coupled to the burner section and configured to fan flames within the burner section.

13. The wood pellet burner unit of claim 12, wherein:

the fire grate includes a plurality of holes disposed therein;

the igniter is disposed through the fire grate;

the combustion fan is coupled to a bottom surface of the burner section below the fire grate; and the combustion fan is configured to provide external air toward an interior of the burner section, through the plurality of holes in the fire grate, and toward the wood pellets in the lower region of the burner unit so that the wood pellets continue to burn.

14. The wood pellet burner unit of claim 10, further comprising a chute coupled to the staging section and configured to:

receive the wood pellets from the staging section; and guide the wood pellets to the lower region of the wood pellet burner unit.

15. The wood pellet burner unit of claim 14, further comprising:

a smoker housing; and a fire pot, wherein:

the smoker housing encloses the chute;

the fire pot is coupled to a bottom surface of the smoker housing;

the chute is configured to guide the wood pellets into the fire pot; and the igniter is coupled to the fire pot.

16. The wood pellet burner unit of claim 15, further comprising a combustion fan coupled to the fire pot and configured to fan flames within the fire pot.

17. The wood pellet burner unit of claim 15, wherein the smoker housing includes one or more racks or grills for holding meat.

18. The wood pellet burner unit of claim 15, wherein the igniter is disposed through a wall of the fire pot.

* * * * *